United States Patent
Bower, III et al.

(10) Patent No.: US 9,141,770 B1
(45) Date of Patent: Sep. 22, 2015

(54) ENTITLEMENT TRANSFER DURING A REPAIR ACTIVITY

(71) Applicant: International Business Machines Corporation, Armonk, NY (US)

(72) Inventors: Fred A. Bower, III, Durham, NC (US); Le Wei Ji, Shanghai (CN); Dao Quan Yang, Shanghai (CN); Binqi Zhang, Shanghai (CN); Caihong Zhang, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 36 days.

(21) Appl. No.: 14/260,372

(22) Filed: Apr. 24, 2014

(51) Int. Cl.
 *G06F 21/10* (2013.01)

(52) U.S. Cl.
 CPC ...... *G06F 21/105* (2013.01); *G06F 2221/0759* (2013.01); *G06F 2221/0768* (2013.01)

(58) Field of Classification Search
 CPC combination set(s) only.
 See application file for complete search history.

(56) References Cited

U.S. PATENT DOCUMENTS

| | | |
|---|---|---|
| 5,864,664 A | 1/1999 | Capps, Jr. et al. |
| 6,154,728 A | 11/2000 | Sattar et al. |

(Continued)

FOREIGN PATENT DOCUMENTS

| | | |
|---|---|---|
| GB | 2404472 A | 2/2005 |
| WO | 0022520 A1 | 4/2000 |

OTHER PUBLICATIONS

"Advanced Settings Utility, v9.40 User's Guide" Version 9.40, IBM, Eighteenth Edition (Jun. 2013), Copyright IBM Corporation 2004, 2013. <http://www-933.ibm.com/support/fixcentral/systemx/select Fix?product=ibm%2Fsystemx%2F7875&fixids=ibm_utl_asu_asut80o-9.40_linux_i686&source=dbluesearch&function=fixId &parent=BladeCenter%20HS23>.

(Continued)

*Primary Examiner* — Beemnet Dada
(74) *Attorney, Agent, or Firm* — Katherine S. Brown; Jeffrey L. Streets

(57) ABSTRACT

Embodiments of the present invention disclose a method, computer program product, and system for managing activation keys associated with a computing system. In one embodiment, in accordance with the present invention, the computer implemented method includes the steps of detecting a repair activity on a computing system, determining whether at least one system identifier (ID) associated with a component of the computing system has changed in comparison to system IDs associated with components of the computing system before the detected repair activity, responsive to determining that at least one system ID associated with a component of the computing system has changed, retrieving one or more activation keys that correspond to the determined at least one system ID, and determining whether the one or more retrieved activation keys are associated with a system ID that does not match any system ID associated with a component of the computing system.

20 Claims, 3 Drawing Sheets

(56) References Cited

U.S. PATENT DOCUMENTS

| | | | |
|---|---|---|---|
| 6,513,121 | B1 | 1/2003 | Serkowski |
| 7,363,392 | B2 | 4/2008 | Thomas |
| 7,516,250 | B2 | 4/2009 | Pierce et al. |
| 7,681,245 | B2 | 3/2010 | Walker et al. |
| 7,844,572 | B2 | 11/2010 | Walker et al. |
| 7,870,312 | B2 | 1/2011 | Thomas |
| 7,881,945 | B2 * | 2/2011 | Schmitt et al. ............... 705/1.1 |
| 8,423,729 | B2 | 4/2013 | Yuuki |
| 8,650,431 | B2 * | 2/2014 | Floyd et al. ........................ 714/3 |
| 2003/0040942 | A1 * | 2/2003 | Hooten ............................. 705/4 |
| 2003/0055846 | A1 | 3/2003 | Cheston et al. |
| 2008/0269916 | A1 * | 10/2008 | Malone et al. ................. 700/17 |
| 2012/0047499 | A1 * | 2/2012 | Krzystofczyk et al. ........ 717/174 |
| 2014/0053285 | A1 * | 2/2014 | Asadullah et al. ............... 726/32 |

OTHER PUBLICATIONS

"IBM Systems Dynamic System Analysis Installation and User's Guide" Version 9.40, Copyright IBM Corporation 2009, 2013. <http://www-933.ibm.com/support/fixcentral/systernx/selectFix?product=ibm%2Fsystemx%2F25838&fixids=ibm_utl_dsa_dsytb7x-9.40_portable_sles11_i386&source=dbluesearch&function=fixId&parent=System%20x3250%20M4>.

* cited by examiner

ENTITLEMENT TRANSFER DURING A REPAIR ACTIVITY

FIELD OF THE INVENTION

The present invention relates generally to the field of optional feature entitlement, and more particularly to entitlement transfer during a repair activity.

STATEMENT REGARDING PRIOR DISCLOSURES BY THE INVENTOR OR A JOINT INVENTOR

Various aspects of the present invention have been disclosed in the products Advanced Settings Utility (ASU) 9.40 and Dynamic System Analysis (DSA) 9.40, made publicly available on Jun. 7, 2013. This disclosure is submitted under 35 U.S.C. 102(b)(1)(A). The following documentation is provided in support:
 IBM Support: Fix Central, IBM Advanced Settings Utility (ASU);
 Advanced Settings Utility, v9.40 User's Guide;
 IBM Support Fix Central, IBM Dynamic System Analysis (DSA) 9.40—Portable;
 Dynamic System Analysis Installation and User's Guide.

BACKGROUND

In computing systems, optional features are content that a computing system can subscribe to, or access, that is not enabled in the base capabilities of the computing system. For example, a server computer can optionally have access to a suite of applications with varying capabilities. Optional feature activation is commonly achieved through digitally signed activation key files (e.g., product keys, software keys, activation keys, etc.), which provide proof of entitlement of a computing device to access a corresponding optional feature. An activation key file is unique and is associated with a computing system that is approved to access the corresponding optional feature, and can be stored locally on the computing system. In some examples, the activation key file is associated with a computing system, or hardware of the computing system, utilizing a specific identifier that provides an indication of the computing device (e.g., a serial number). The computing system utilizes the corresponding activation key file and the specific identifier (i.e., feature entitlement information) to access the corresponding optional feature.

SUMMARY

Embodiments of the present invention disclose a method, computer program product, and system for managing activation keys associated with a computing system. In one embodiment, in accordance with the present invention, the computer implemented method includes the steps of detecting a repair activity on a computing system, determining whether at least one system identifier (ID) associated with a component of the computing system has changed in comparison to system IDs associated with components of the computing system before the detected repair activity, responsive to determining that at least one system ID associated with a component of the computing system has changed, retrieving one or more activation keys that correspond to the determined at least one system ID, and determining whether the one or more retrieved activation keys are associated with a system ID that does not match any system ID associated with a component of the computing system.

DETAILED DESCRIPTION

Embodiments of the present invention allow for automated entitlement transfer and reactivation during a repair activity, based on reprogrammed system identifiers (IDs) or an activation key that does not match a system ID. Entitlement information for the computing device is updated and transferred responsive to detecting a repair activity on a computing device, which can include replacing a hardware element of the computing system. Entitlement information can include an activation key and a specific identifier (e.g., a system ID) of the computing system that indicates that the computing system is entitled to access and utilize a corresponding feature.

Some embodiments of the present invention recognize that when a part of a computing system (e.g., a hardware element of a computing system) that stores activation key information is replaced, the stored activation key information is lost. The corresponding activation key information can then be reinstalled on the replacement part. Additionally, if the activation key is bound to the computing system utilizing a system ID (e.g., a serial number) of the part that was replaced, then the new system ID of the replacement part needs to be programmed to be in association with the activation key.

Figure 1:
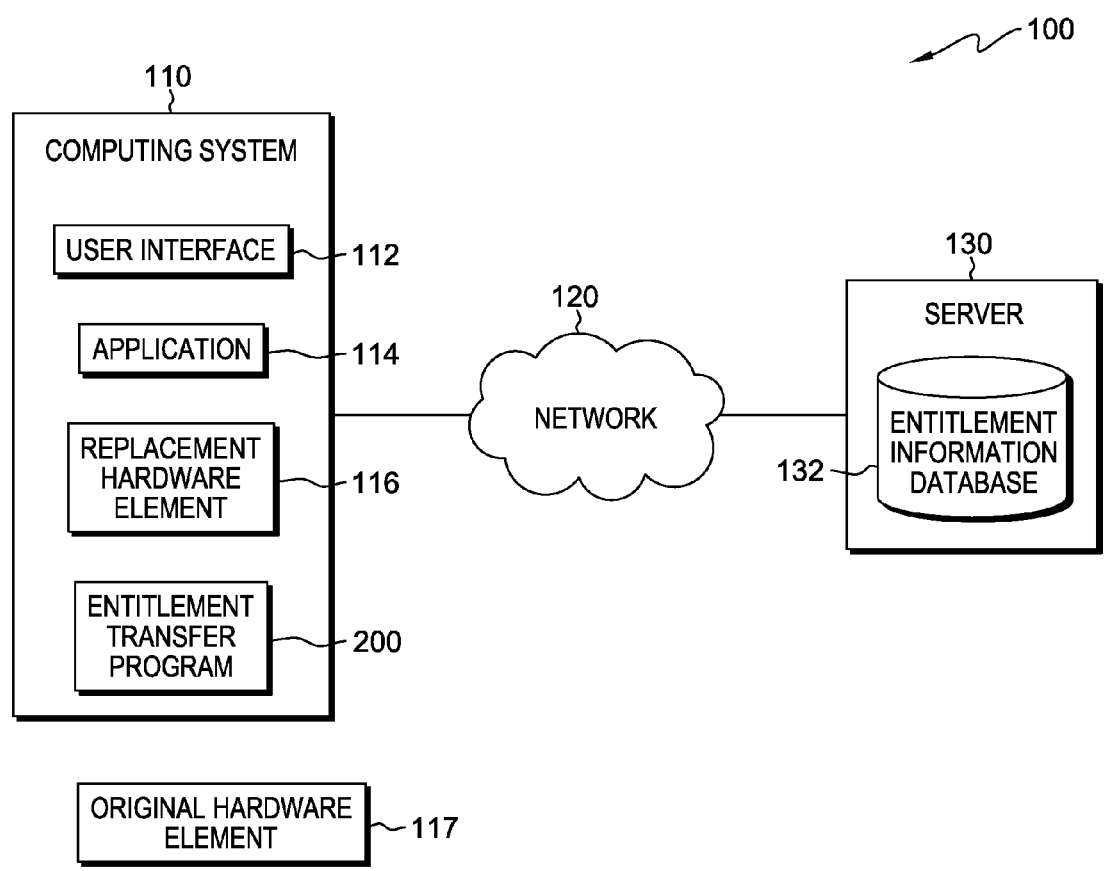
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes computing system 110 and server 130, interconnected over network 120. In various embodiments of the present invention, computing system 110 may be a workstation, personal computer, personal digital assistant, mobile phone, or any other device capable of executing program instructions in accordance with embodiments of the present invention. In general, computing system 110 is representative of any electronic device or combination of electronic devices capable of executing machine-readable program instructions, as described in greater detail with regard to FIG. 3, in accordance with embodiments of the present invention. In an example embodiment, computing system 110 is a rack-mounted server. In other embodiments, computing system 110 can be any system that utilizes optional key-activated features, such as content that a computing system can subscribe to, or optionally access.

Computing system 110 includes user interface 112, application 114, replacement hardware element 116, and entitlement transfer program 200. User interface 112 accepts input from individuals utilizing computing system 110. In example embodiments, an individual (through input via user interface 112) utilizing computing system 110 can utilize application 114 to communicate with server 130, via network 120. In an example, application 114 can be embedded system firmware of computing system 110, or other applications, that computing system 110 can utilize to access an optional feature. In example embodiments, entitlement transfer program 200 transfers entitlement for optional features corresponding to computing system 110, in accordance with embodiments of the present invention discussed in greater detail with regard to FIG. 2.

Replacement hardware element 116 is a hardware component of computing system 110 that has replaced original hardware element 117 during a repair activity. In one embodiment, original hardware element 117 includes activation key information. In another embodiment, an activation key that is associated with computing system 110 utilizes a specific identifier of the system ID for original hardware element 117. At the time of installation, replacement hardware element 116 does not include activation key information, or a common system ID with original hardware component 117. In example embodiments, replacement hardware element 116 and original hardware element 117 can be any hardware component, or plurality of hardware elements of computing system 110 that can be associated with activation key information (e.g., a printed circuit board (PCB), an application-specific integrated circuit (ASIC), etc.).

In one embodiment, computing system 110 and server 130 communicate through network 120. Network 120 can be, for example, a local area network (LAN), a telecommunications network, a wide area network (WAN) such as the Internet, or a combination of the three, and include wired, wireless, or fiber optic connections. In general, network 120 can be any combination of connections and protocols that will support communications between computing system 110 and server 130 in accordance with embodiments of the present invention.

In example embodiments, server 130 can be a desktop computer, computer server, or any other computer system known in the art. In certain embodiments, server 130 represents computer systems utilizing clustered computers and components (e.g., database server computers, application server computers, etc.) that act as a single pool of seamless resources when accessed by elements of data processing environment 100 (e.g., computing system 110). In general, server 130 is representative of any electronic device or combination of electronic devices capable of executing machine-readable program instructions, as described in greater detail with regard to FIG. 3, in accordance with embodiments of the present invention.

Server 130 includes entitlement information database 132. In various embodiments, server 130 hosts entitlement information database 132, which includes activation key information describing one or more activation keys, identification information that associates activation keys with computing systems (e.g., system IDs associated with computing system 110, serial numbers associated with computing system 110, etc.), and corresponding optional feature entitlement that is associated with identification information. Entitlement information database 132 can be implemented with any type of storage device, for example, persistent storage 308 (of FIG. 3), which is capable of storing data that may be accessed and utilized by computing system 110 and server 130, such as a database server, a hard disk drive, or flash memory. In other embodiments, entitlement information database 132 can represent multiple storage devices within 130. In another embodiment, server 130 can be a database server that stores, hosts, and facilitates access to data that is stored in entitlement information database 132.

In one embodiment, computing system 110, or an individual utilizing client device 110, accesses server 130 via network 120 to access data that is stored on entitlement information database 132. Computing system 110 is capable of retrieving information (e.g., activation keys) from entitlement information database 132, and updating information that is stored on entitlement information database 132 (e.g., system IDs and serial numbers). In an example embodiment, entitlement information database 132 includes an activation key, which is also stored on original hardware element 117. Additionally, entitlement information database 132 stores an indication (e.g., a system ID of original hardware element 117) that the activation key corresponds to original hardware element 117 being entitled to utilize a corresponding optional feature.

Figure 2:
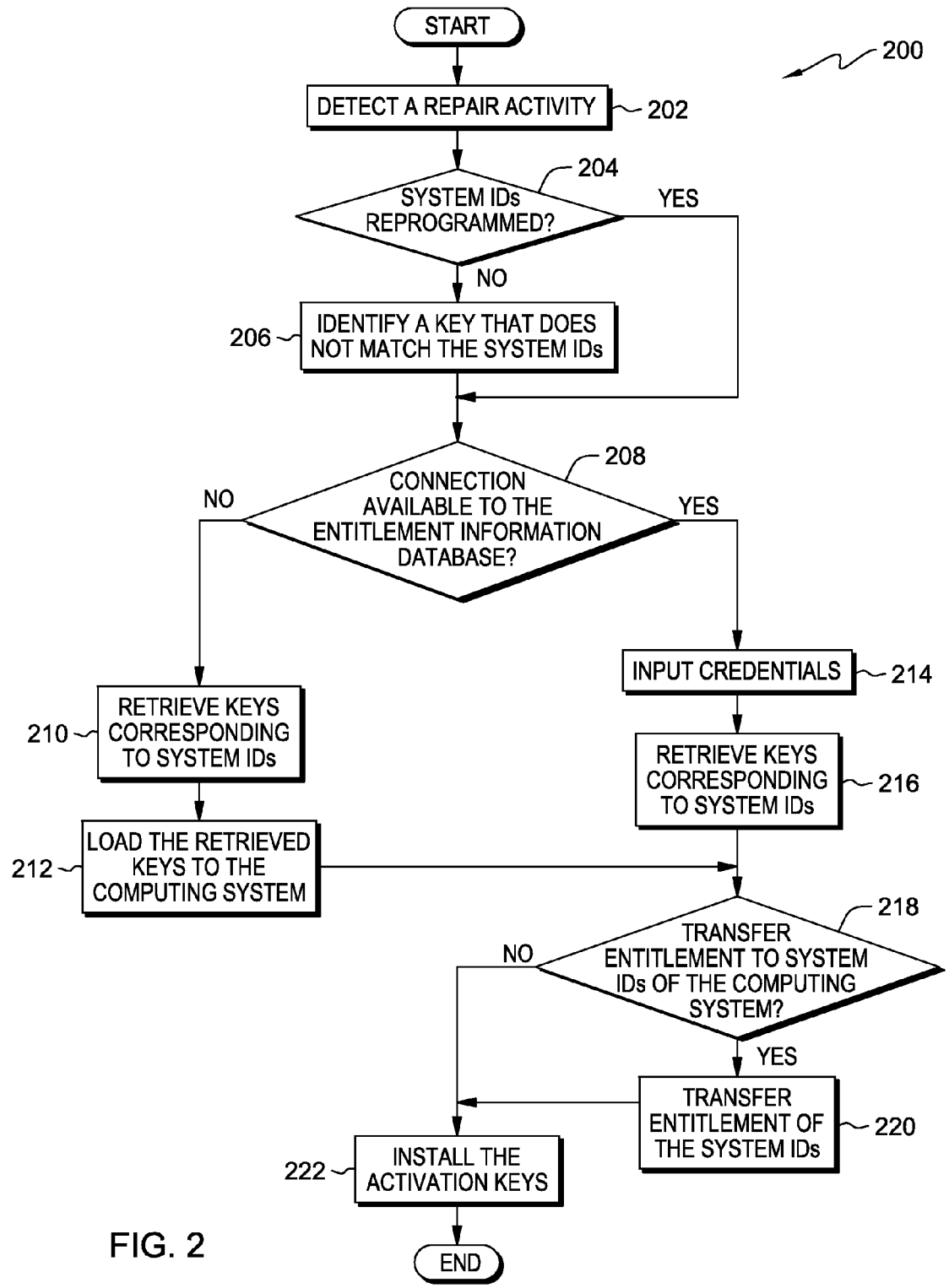
FIG. 2 is a flowchart depicting operational steps of a program for transferring entitlement to access and utilize optional features, in accordance with an embodiment of the present invention.

FIG. 2 is a flowchart depicting operational steps of entitlement transfer program 200 in accordance with an embodiment of the present invention. In one embodiment, entitlement transfer program 200 initiates responsive to a detection of a repair activity on computing system 110.

In step 202, entitlement transfer program 200 detects a repair activity. A repair activity can be a replacement of one or more hardware elements in a computing system (e.g., computing system 110), or any change to a computing system that could nullify existing activation keys that check entitlement validity against the computing system (e.g., changing a system ID or serial number of one or more hardware elements of the computing system that is associated with an activation key). In one embodiment, entitlement transfer program 200 detects a repair activity through an identification of a replacement of a part of computing system 110 that stores activation keys, or a replacement part with an identity (e.g., a system ID) that is different than an original identity that is associated with an activation key.

In one example, computing system 110 initially includes original hardware element 117, which includes an optional feature activation key that is associated with a serial number of original hardware element 117. During a repair activity on computing system 110, original hardware element 117 is replaced by replacement hardware element 116, which does not include the optional feature activation key, and does not have the same serial number as original hardware element 117. In this example, entitlement transfer program 200 detects the repair activity of replacement hardware element 116 replacing original hardware element 116.

In step 204, entitlement transfer program 200 determines whether system IDs have been reprogrammed. More specifically, entitlement transfer program 200 determines whether system IDs (e.g., serial numbers) are different for components of computing system 110 than the system IDs prior to the detected repair activity (e.g., a set of prior system IDs in a system inventory). For example, entitlement transfer program 200 determines that an element has been replaced with an element that has a different system ID, or a system ID of an element of computing system 110 has changed (e.g., been reprogrammed). In an example embodiment, entitlement transfer program 200 determines that the system ID of replacement hardware element 116 is different than original hardware element 117, and therefore entitlement transfer program 200 determines that the system IDs have been reprogrammed. In another embodiment, entitlement transfer program 200 performs the reprogramming of system IDs, and detects that a system ID has been reprogrammed is implicit in the reprogramming process.

In step 206, entitlement transfer program 200 identifies a key that does not match the system IDs. More specifically, responsive to determining that system IDs of computing system 110 have not been reprogrammed (decision step 204, "no" branch), entitlement transfer program 200 identifies an activation key on computing system 110 that does not match the system IDs of components of computing system 110 (e.g., replacement hardware element 116). For example, entitlement transfer program 200 identifies an activation key on computing system 110 that does not match the system ID of replacement hardware element 116, because the activation key is associated with the system ID of original hardware element 117.

In step 208, entitlement transfer program 200 determines whether a connection is available to the entitlement information database. In one embodiment, entitlement transfer program 200 determines whether computing system 110 can access (e.g., through network 120) entitlement information database 132 on server 130. In one embodiment, responsive to determining that system IDs of computing system 110 have been reprogrammed (decision step 204, "yes" branch), entitlement transfer program 200 determines whether computing system 110 can access entitlement information database 132 on server 130.

In step 210, entitlement transfer program 200 retrieves keys corresponding to system IDs. More specifically, responsive to determining that a connection is not available to the entitlement information database (decision step 208, "no" branch), entitlement transfer program 200 retrieves keys that correspond to system IDs associated with computing system 110 from a user of computing system 110 (e.g., via user input into user interface 112). In an example embodiment, since entitlement transfer program 200 determines that a connection to entitlement information database 132 is not available (in decision step 210), a user of computing system 110 manually accesses entitlement information database 132 on server 130, not using computing system 110, to retrieve keys that correspond to system IDs associated with computing system 110. In this example, entitlement transfer program 200 provides a prompt for user input of keys into computing system 110, and the user of computing system 110 can input retrieved keys via user interface 112. For example, the user of computing system 110 uses a different computing system (not pictured) to access entitlement information database 132 on server 130 and retrieve the activation keys that correspond to system IDs that are associated with computing system 110. In one embodiment, entitlement transfer program 200 retrieves keys corresponding to system IDs that have been reprogrammed (from step 204), and system IDs that do not match an associated activation key (identified in step 206).

In step 212, entitlement transfer program 200 loads the retrieved keys to the computing system. More specifically, entitlement transfer program 200 loads the activation keys that correspond to system IDs associated with computing system 110 (retrieved in step 210). In an example embodiment, entitlement transfer program 200 loads the activation keys that the user of computing device 110 retrieved and input (e.g., into a prompt via user interface 112 in step 210) into entitlement transfer program 200.

In step 214, entitlement transfer program 200 inputs credentials. More specifically, responsive to determining that a connection is available to the entitlement information database (decision step 208, "yes" branch), entitlement transfer program 200 inputs access credentials (e.g., login credentials) associated with computing system 110 to server 130 for access to entitlement information database 132. In one embodiment, entitlement transfer program 200 automatically inputs access credentials on behalf of a user of computing system 110 to access entitlement information database on server 130.

In step 216, entitlement transfer program 200 retrieves keys corresponding to system IDs. More specifically, entitlement transfer program 200 retrieves activation keys on entitlement information database 132 that correspond to system IDs associated with computing system 110. In an example embodiment, entitlement transfer program 200 identifies activation keys associated with one or more system IDs (e.g., serial number) associated with computing system 110, and downloads the identified activation keys. In one embodiment, entitlement transfer program 200 retrieves keys corresponding to system IDs that have been reprogrammed (from step 204), and system IDs that do not match an associated activation key (identified in step 206).

In step 218, entitlement transfer program 200 determines whether to transfer entitlement to system IDs of the computing system. More specifically, entitlement transfer program 200 determines whether the retrieved activation keys (from step 210 or 216) have associated system IDs that do not match a component of computing system 110 (e.g., system inventory of computing system 110, which includes replacement hardware element 116). In one embodiment, entitlement transfer program 200 checks the retrieved activation keys against a system inventory of computing system 110 to determine whether an activation key is not associated with a system ID of a component of computing system 110 to activate entitlement of an optional feature, and to determine whether a component of computing system 110 is capable of utilizing the optional feature.

In an example embodiment, entitlement transfer program 200 utilizes the retrieved activation keys and system inventory of computing system 110, and determines that an activation key is not associated with any components of computing system 110 (e.g., the activation key is associated with original hardware element 117). In this example, entitlement transfer program 200 can then identify a component of computing system that is capable of utilizing the optional feature associated with the activation key (e.g., replacement hardware element 116).

In step 220, entitlement transfer program 200 transfers entitlement of the system IDs. More specifically, responsive to determining to transfer entitlement to system IDs of computing system 110 (decision step 218, "yes" branch), entitlement transfer program 200 transfers entitlement of the system IDs. In one embodiment, entitlement transfer program 200 transfers entitlement to access to an optional feature from a previous system ID to a system ID of the component of computing system 110 that is capable of utilizing the optional feature (e.g., from original hardware element 117 to replacement hardware element 116). In other embodiments, entitlement transfer program 200 determines an updated activation key (e.g., issues a new activation key, or modifies an existing activation key) corresponding to the transferred entitlement. Additionally, entitlement transfer program 200 updates information in entitlement information database 132, and other storage locations with optional feature entitlement information that corresponds to computing system 110, based on the transferred entitlement and activation keys (new or modified). In another embodiment, entitlement transfer program 200 transfers entitlement to a system ID of an ASIC of computing system 110 (e.g., both original hardware element 117 and replacement hardware element 116 are ASIC's).

In embodiments when activation keys are retrieved manually by a user of computing system 110 in step 210, a user of computing system 110 manually accesses entitlement information database 132 on server 130, not using computing system 110, and transfers entitlement for access to an optional feature from a previous system ID to a system ID of the component of computing system 110 that is capable of utilizing the optional feature.

In step 222, entitlement transfer program 200 installs the activation keys. In one embodiment, entitlement transfer program 200 installs retrieved activation keys (from step 210 or 216) and any activation keys that are new or modified that correspond to a transfer of entitlement (from step 220) to computing system 110. In another embodiment, responsive to determining to not transfer entitlement to system IDs of computing system 110 (decision step 218, "no" branch), entitlement transfer program 200 installs retrieved activation keys (from step 210 or 216) to computing system 110. Responsive to installing activation keys associated with system IDs of components of computing system 110, computing system 110 will be capable of accessing and utilizing the corresponding optional features.

Figure 3:
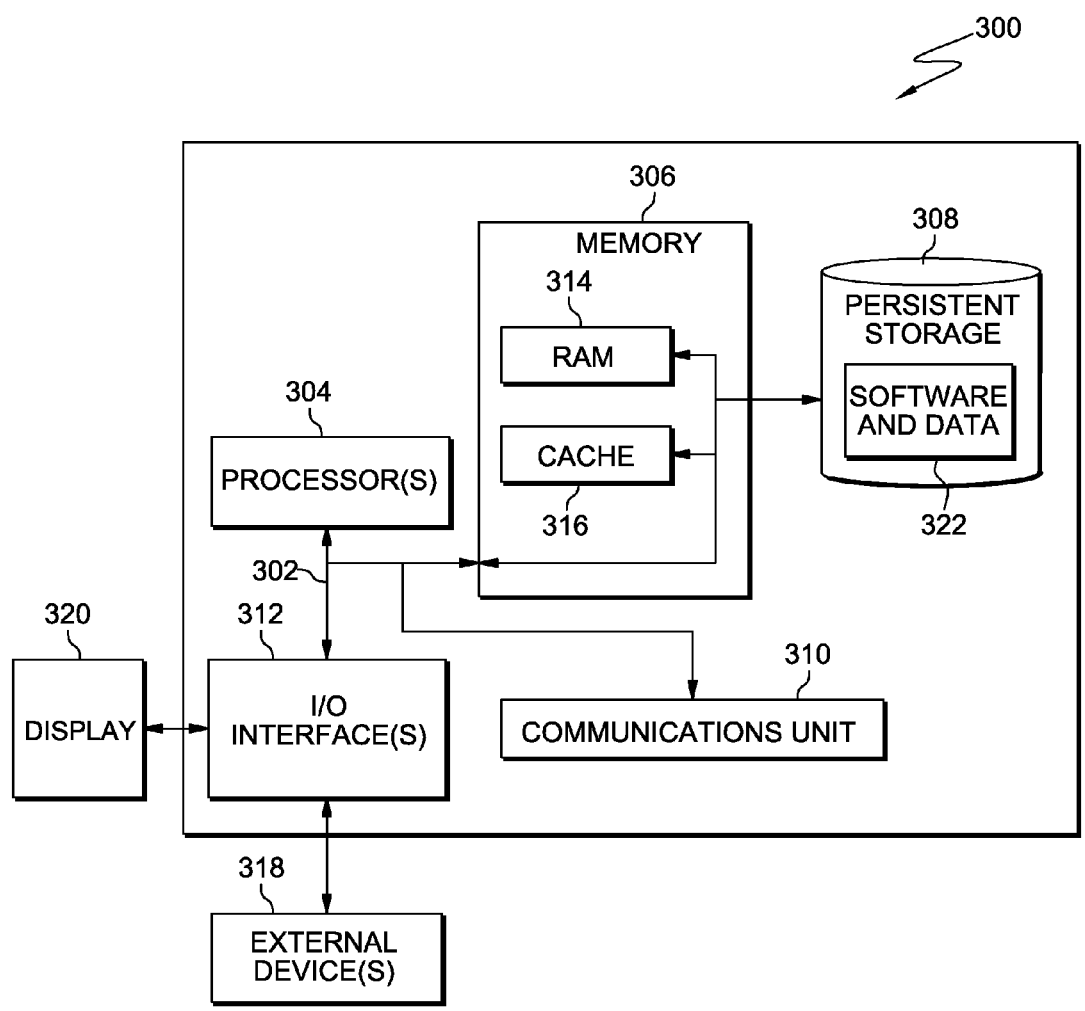
FIG. 3 depicts a block diagram of components of the computing system of FIG. 1 in accordance with an embodiment of the present invention.

FIG. 3 depicts a block diagram of components of computer 300, which is representative of computing system 110 and server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer readable storage device. Software and data 322 are stored in persistent storage 308 for access and/or execution by processors 304 via one or more memories of memory 306. With respect to computing system 110, software and data 322 represents application 114 and entitlement transfer program 200.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links.

Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing activation keys associated with a computing system, the method comprising:
    detecting, by one or more processors, a repair activity on a computing system;
    determining, by said one or more processors, whether at least one system identifier (ID) associated with a component of the computing system has changed in comparison to system IDs associated with components of the computing system before the detected repair activity;
    responsive to determining that at least one system ID associated with a component of the computing system has changed, retrieving, by said one or more processors, one or more activation keys that correspond to the determined at least one system ID; and
    determining, by said one or more processors, whether the one or more retrieved activation keys are associated with a system ID that does not match any system ID associated with a component of the computing system.

2. The method of claim 1, further comprising:
    responsive to determining that the one or more retrieved activation keys are associated with a system ID that does not match any system ID associated with a component of the computing system, identifying, by said one or more processors, a component of the computing system and a corresponding system ID that is capable of utilizing an optional feature that corresponds to the determined one or more activation keys;
    determining, by said one or more processors, an updated activation key that associated the system ID of the identified component of the computing system with entitlement to utilize a corresponding optional feature; and
    installing, by said one or more processors, the determined updated activation key and the retrieved one or more activation keys on the computing system.

3. The method of claim 1, further comprising:
    responsive to determining that the one or more retrieved activation keys are associated with a system ID that does match a system ID associated with a component of the computing system, installing, by said one or more processors, the retrieved one or more activation keys on the computing system.

4. The method of claim 1, wherein the detecting a repair activity on a computing system comprises one or more of: detecting a replacement of one or more hardware components of the computing system, and detecting a change to the computing system that nullifies existing activation keys associated with the computing system.

5. The method of claim 1, wherein the determining whether at least one system identifier (ID) associated with a component of the computing system has changed in comparison to system IDs associated with components of the computing system before the detected repair activity, further comprises:

identifying, by said one or more processors, an activation key stored on the computing system that is not associated with a system ID of the components of the computing system.

6. The method of claim 1, wherein a system ID is a serial number of a hardware element of the computing system.

7. The method of claim 1, wherein the component of the computing system is an application-specific integrated circuit (ASIC).

8. A computer program product for managing activation keys associated with a computing system, the computer program product comprising:

one or more computer readable storage media and program instructions stored on the one or more computer readable storage media, the program instructions comprising:

program instructions to detect a repair activity on a computing system;

program instructions to determine whether at least one system identifier (ID) associated with a component of the computing system has changed in comparison to system IDs associated with components of the computing system before the detected repair activity;

responsive to determining that at least one system ID associated with a component of the computing system has changed, program instructions to retrieve one or more activation keys that correspond to the determined at least one system ID; and program instructions to determine whether the one or more retrieved activation keys are associated with a system ID that does not match any system ID associated with a component of the computing system.

9. The computer program product of claim 8, further comprising program instructions to:

responsive to determining that the one or more retrieved activation keys are associated with a system ID that does not match any system ID associated with a component of the computing system, identify a component of the computing system and a corresponding system ID that is capable of utilizing an optional feature that corresponds to the determined one or more activation keys;

determine an updated activation key that associated the system ID of the identified component of the computing system with entitlement to utilize a corresponding optional feature; and install the determined updated activation key and the retrieved one or more activation keys on the computing system.

10. The computer program product of claim 8, further comprising program instructions to:

responsive to determining that the one or more retrieved activation keys are associated with a system ID that does match a system ID associated with a component of the computing system, install the retrieved one or more activation keys on the computing system.

11. The computer program product of claim 8, wherein the detecting a repair activity on a computing system comprises one or more of: detecting a replacement of one or more hardware components of the computing system, and detecting a change to the computing system that nullifies existing activation keys associated with the computing system.

12. The computer program product of claim 8, wherein the program instructions to determine whether at least one system identifier (ID) associated with a component of the computing system has changed in comparison to system IDs associated with components of the computing system before the detected repair activity, further comprise program instructions to:

identifying, by one or more processors, an activation key stored on the computing system that is not associated with a system ID of the components of the computing system.

13. The computer program product of claim 8, wherein a system ID is a serial number of a hardware element of the computing system.

14. The computer program product of claim 8, wherein the component of the computing system is an application-specific integrated circuit (ASIC).

15. A computer system for managing activation keys associated with a computing system, the computer system comprising:

one or more computer processors;

one or more computer readable storage media; and program instructions stored on the computer readable storage media for execution by at least one of the one or more processors, the program instructions comprising:

program instructions to detect a repair activity on a computing system;

program instructions to determine whether at least one system identifier (ID) associated with a component of the computing system has changed in comparison to system IDs associated with components of the computing system before the detected repair activity;

responsive to determining that at least one system ID associated with a component of the computing system has changed, program instructions to retrieve one or more activation keys that correspond to the determined at least one system ID; and program instructions to determine whether the one or more retrieved activation keys are associated with a system ID that does not match any system ID associated with a component of the computing system.

16. The computer system of claim 15, further comprising program instructions to:

responsive to determining that the one or more retrieved activation keys are associated with a system ID that does not match any system ID associated with a component of the computing system, identify a component of the computing system and a corresponding system ID that is capable of utilizing an optional feature that corresponds to the determined one or more activation keys;

determine an updated activation key that associated the system ID of the identified component of the computing system with entitlement to utilize a corresponding optional feature; and install the determined updated activation key and the retrieved one or more activation keys on the computing system.

17. The computer system of claim 15, further comprising program instructions to:

responsive to determining that the one or more retrieved activation keys are associated with a system ID that does match a system ID associated with a component of the computing system, install the retrieved one or more activation keys on the computing system.

18. The computer system of claim 15, wherein the detecting a repair activity on a computing system comprises one or more of: detecting a replacement of one or more hardware components of the computing system, and detecting a change to the computing system that nullifies existing activation keys associated with the computing system.

19. The computer system of claim 15, wherein the program instructions to determine whether at least one system identifier (ID) associated with a component of the computing system has changed in comparison to system IDs associated with components of the computing system before the detected repair activity, further comprise program instructions to:
    identifying, by one or more processors, an activation key stored on the computing system that is not associated with a system ID of the components of the computing system.

20. The computer system of claim 15, wherein a system ID is a serial number of a hardware element of the computing system.

\* \* \* \* \*